(12) United States Patent
Kai et al.

(10) Patent No.: US 8,730,588 B2
(45) Date of Patent: May 20, 2014

(54) ZOOM LENS AND IMAGE PICKUP UNIT

(71) Applicant: Sony Corporation, Tokyo (JP)

(72) Inventors: Hideki Kai, Kanagawa (JP); Syuuji Maki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/680,809

(22) Filed: Nov. 19, 2012

(65) Prior Publication Data

US 2013/0155294 A1 Jun. 20, 2013

(30) Foreign Application Priority Data

Dec. 20, 2011 (JP) ................................. 2011-278265

(51) Int. Cl.
*G02B 15/14* (2006.01)
*H04N 5/262* (2006.01)

(52) U.S. Cl.
CPC ................ *G02B 15/14* (2013.01); *H04N 5/262* (2013.01)
USPC ...................................... 359/687; 348/240.3

(58) Field of Classification Search
CPC ........ G02B 15/14; G02B 15/16; G02B 15/20; H04N 5/262; H04N 5/225
USPC ......................... 348/240.3, 340; 359/686, 687
See application file for complete search history.

(56) References Cited

U.S. PATENT DOCUMENTS

| | | | | |
|---|---|---|---|---|
| 4,359,270 A | * | 11/1982 | Okudaira | ....................... 359/687 |
| 7,583,450 B2 | * | 9/2009 | Ishii | ............................... 359/687 |
| 7,817,346 B2 | * | 10/2010 | Arimoto et al. | ................ 359/687 |
| 8,254,036 B2 | * | 8/2012 | Aoi | ................................ 359/687 |
| 2013/0229564 A1 | * | 9/2013 | Saori | ............................ 348/340 |

FOREIGN PATENT DOCUMENTS

| | | |
|---|---|---|
| JP | 2000-275523 A | 10/2000 |
| JP | 2002-323656 A | 11/2002 |
| JP | 2003-177317 A | 6/2003 |
| JP | 2003-241092 A | 8/2003 |
| JP | 2007-114432 A | 5/2007 |
| JP | 2009-058980 A | 3/2009 |
| JP | 2009-156891 A | 7/2009 |
| JP | 2010-237453 A | 10/2010 |

* cited by examiner

*Primary Examiner* — David N Spector
(74) *Attorney, Agent, or Firm* — Rader, Fishman & Grauer PLLC (57) ABSTRACT

A zoom lens includes: a first lens group having positive refractive power, a second lens group having negative refractive power, a third lens group having positive refractive power, and a fourth lens group having positive refractive power, the first to fourth lens groups being arranged in order from an object side, in which zooming is performed through varying a distance between adjacent lens groups of the first to fourth lens groups, and the fourth lens group includes a first positive lens, a first negative meniscus lens, and a cemented lens which are arranged in order from the object side, the cemented lens being configured of a second negative meniscus lens with a convex surface facing the object side and a second positive lens.

11 Claims, 10 Drawing Sheets

EXAMPLE 1

WIDE-ANGLE END

FIG. 2A WIDE-ANGLE END

FIG. 2B INTERMEDIATE

FIG. 2C TELEPHOTO END

FIG. 3

EXAMPLE 1 · WIDE-ANGLE END

FIG. 4A  FIG. 4B  FIG. 4C  FIG. 4D

EXAMPLE 1 - IMMEDIATE FOCAL LENGTH

FIG. 5A SPHERICAL ABERRATION

FIG. 5B ASTIGMATISM

FIG. 5C DISTORTION

FIG. 5D LATERAL ABERRATION

EXAMPLE 1 - TELEPHOTO END

FIG. 6A SPHERICAL ABERRATION
FIG. 6B ASTIGMATISM
FIG. 6C DISTORTION
FIG. 6D LATERAL ABERRATION

FIG. 10

ZOOM LENS AND IMAGE PICKUP UNIT

BACKGROUND

The present disclosure relates to a zoom lens suitable as an interchangeable lens attachable to, for example, a digital single-lens reflex camera, and an image pickup unit using such a zoom lens.

As recording measures in digital cameras, there is known a method of recording a subject image formed on a plane of an image pickup device, such as a CCD (Charge Coupled Device) or a CMOS (Complementary Metal Oxide Semiconductor), using photoelectric transducers through converting, based on a light amount, the subject image into an electric output by the photoelectric transducers. In recent years, image pickup devices have a larger number of pixels with the advance of processing techniques and the like, and recording of higher spatial frequency is possible. Accordingly, it is necessary for optical systems to achieve an improvement in imaging performance for a higher-frequency component.

In recent years, with the spread of digital single-lens reflex cameras, a high-power all-in-one zoom lens covering a range from wide-angle to telephoto is in large demand as an interchangeable lens. Besides being necessary for such an interchangeable lens to have high imaging performance, it is desirable that the interchangeable lens be small and lightweight, since the interchangeable lens is often carried while being attached to a camera body.

SUMMARY

As high-power zoom lenses, a positive-negative-positive-positive four-group zoom type (refer to Japanese Unexamined Patent Application Publication Nos. 2000-275523, 2007-114432, 2009-58980, 2003-241092, 2002-323656, and 2003-177317), or a positive-negative-positive-negative-positive five-group zoom type (refer to Japanese Unexamined Patent Application Publication Nos. 2009-156891 and 2010-237453) are frequently used. These zoom types obtain a main zoom ratio through moving a second lens group when zooming is performed from a wide-angle end to a telephoto end. Therefore, to achieve higher power, it is necessary to increase refractive power of the second lens group. However, when the refractive power of the second lens group is increased, a high zoom ratio is obtained, but on the other hand, various aberrations are increased. Therefore, it is difficult to favorably correct off-axial aberration variations varying with zooming.

For example, in a positive-negative-positive-positive four-group zoom lens as described in Japanese Unexamined Patent Application Publication Nos. 2000-275523 and 2007-114432, various aberrations occurring in a second lens group or other lens groups are corrected through increasing the number of lenses. However, while these aberrations are corrected, increase in weight and cost caused by an increase in the number of lenses is inevitable.

Moreover, in a positive-negative-positive-negative-positive five-group zoom lens as described in Japanese Unexamined Patent Application Publication Nos. 2009-156891 and 2010-237453, a part of a zooming function is achieved through varying a distance between a third lens group and a fourth lens group and a distance between a fourth lens group and a fifth lens group. Therefore, a high zoom ratio is obtained without extremely increasing the refractive power of the second lens group, and it is effective to achieve higher power and to correct aberrations. However, an increase in the number of movable groups complicates a mechanical configuration of the zoom lens, and causes an increase in the number of lenses. As a result, it is difficult to reduce the weight and size of the zoom lens.

It is desirable to provide a high-power, but small, lightweight, and high-performance zoom lens, and an image pickup unit.

According to an embodiment of the disclosure, there is provided a zoom lens including: a first lens group having positive refractive power, a second lens group having negative refractive power, a third lens group having positive refractive power, and a fourth lens group having positive refractive power, the first to fourth lens groups being arranged in order from an object side, in which zooming is performed through varying a distance between adjacent lens groups of the first to fourth lens groups, and the fourth lens group includes a first positive lens, a first negative meniscus lens, and a cemented lens which are arranged in order from the object side, the cemented lens being configured of a second negative meniscus lens with a convex surface facing the object side and a second positive lens.

According to an embodiment of the disclosure, there is provided an image pickup unit with a zoom lens and an image pickup device outputting an image pickup signal based on an optical image formed by the zoom lens, the zoom lens including: a first lens group having positive refractive power, a second lens group having negative refractive power, a third lens group having positive refractive power, and a fourth lens group having positive refractive power, the first to fourth lens groups being arranged in order from an object side, in which zooming is performed through varying a distance between adjacent lens groups of the first to fourth lens groups, and the fourth lens group includes a first positive lens, a first negative meniscus lens, and a cemented lens which are arranged in order from the object side, the cemented lens being configured of a second negative meniscus lens with a convex surface facing the object side and a second positive lens.

In the zoom lens or the image pickup unit according to the embodiment of the disclosure, configurations of the respective lens groups in the positive-negative-positive-positive four-group zoom type configuration are optimized, thereby obtaining performance suitable for an interchangeable lens attachable to, for example, a digital single-lens reflex camera.

In the zoom lens or the image pickup unit according to the embodiment of the disclosure, the positive-negative-positive-positive four-group zoom type configuration is adopted, and configurations of the respective lens groups are optimized; therefore, a small size, a light weight, and high performance which are suitable features for an interchangeable lens attachable to, for example, a digital single-lens reflex camera are achievable in spite of high power.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

A preferred embodiment of the disclosure will be described in detail below referring to the accompanying drawings.

[Basic Configuration of Lens]

Figures 1A, 1B:
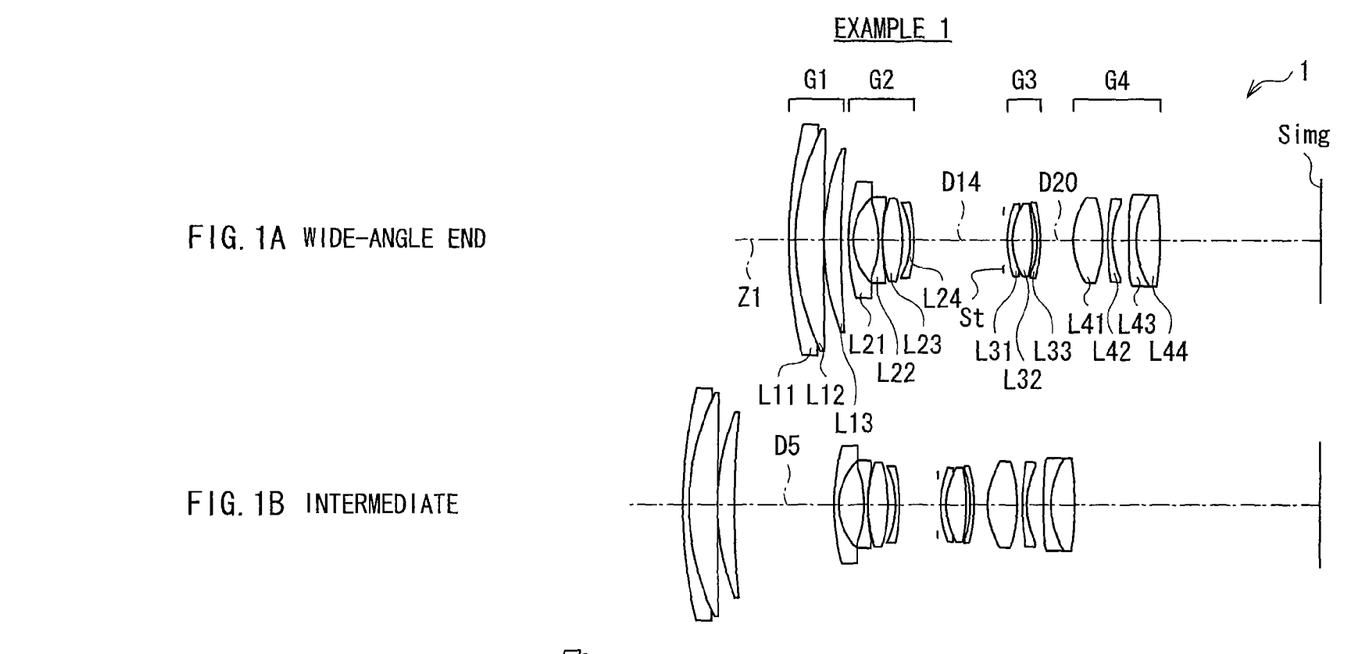
FIGS. 1A to 1C are lens sectional views illustrating a first configuration example of a zoom lens according to an embodiment of the disclosure, and corresponding to Numerical Example 1.
Figure 1C:
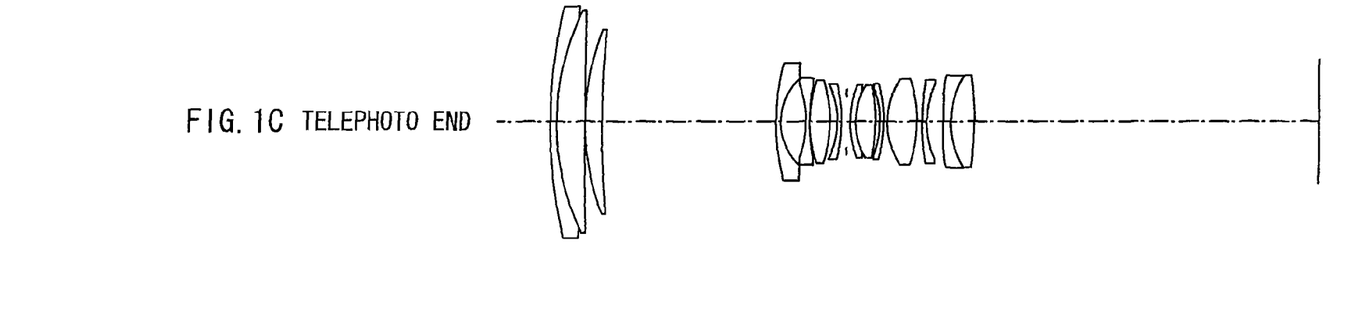
Figures 2A, 2B, 2C:
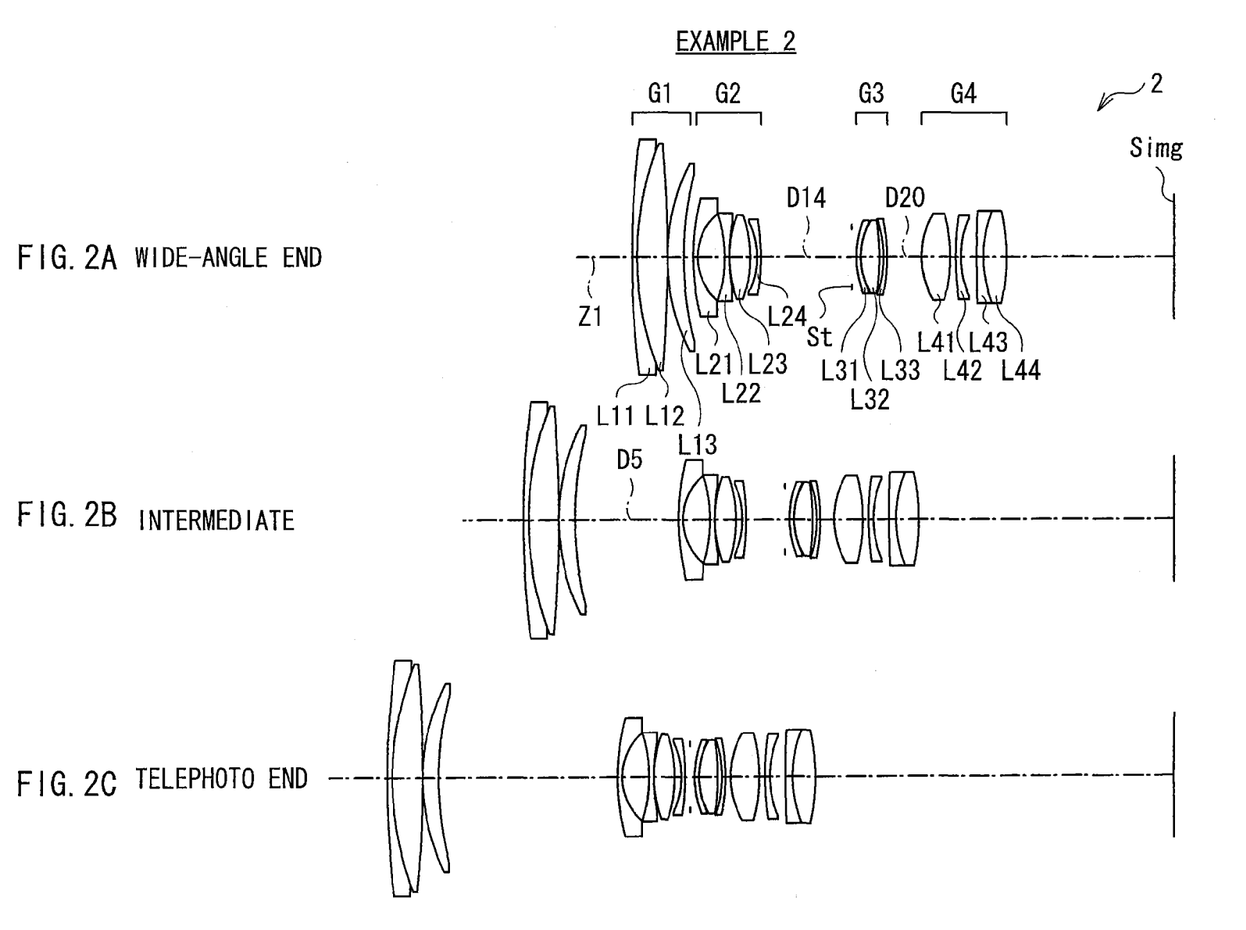
FIGS. 2A to 2C are lens sectional views illustrating a second configuration example of the zoom lens, and corresponding to Numerical Example 2.

FIGS. 1A to 1C illustrate a first configuration example of a zoom lens according to an embodiment of the disclosure. The configuration example corresponds to a lens configuration in Numeral Example 1 which will be described later. It is to be noted that FIGS. 1A, 1B, and 1C correspond to lens arrangements in a wide-angle end state, an intermediate focal length state, and a telephoto end state, respectively. Likewise, FIGS. 2A, 2B, and 2C illustrate a second configuration example corresponding to a lens configuration in Numeral Example 2 which will be described later. In FIGS. 1A to 1C and FIGS. 2A to 2C, a symbol "Simg" represents an image plane, and a symbol "Di" represents a surface distance on an optical axis Z1 between an i-th surface and an i+1-th surface. It is to be noted that Di is assigned to only surface distances (D5, D14, and D20) varying with a change in magnification.

The zoom lens according to the embodiment is substantially configured of four lens groups, i.e., a first lens group G1 having positive refractive power, a second lens group G2 having negative refractive power, a third lens group G3 having positive refractive power, and a fourth lens group G4 having positive refractive power which are arranged along the optical axis Z1 in order from an object side.

An aperture stop St is located closest to the object side of the third lens group G3 between the second lens group G2 and the third lens group G3, and moves together with the third lens group G3 when varying a lens position state with a change in magnification.

Figure 3:
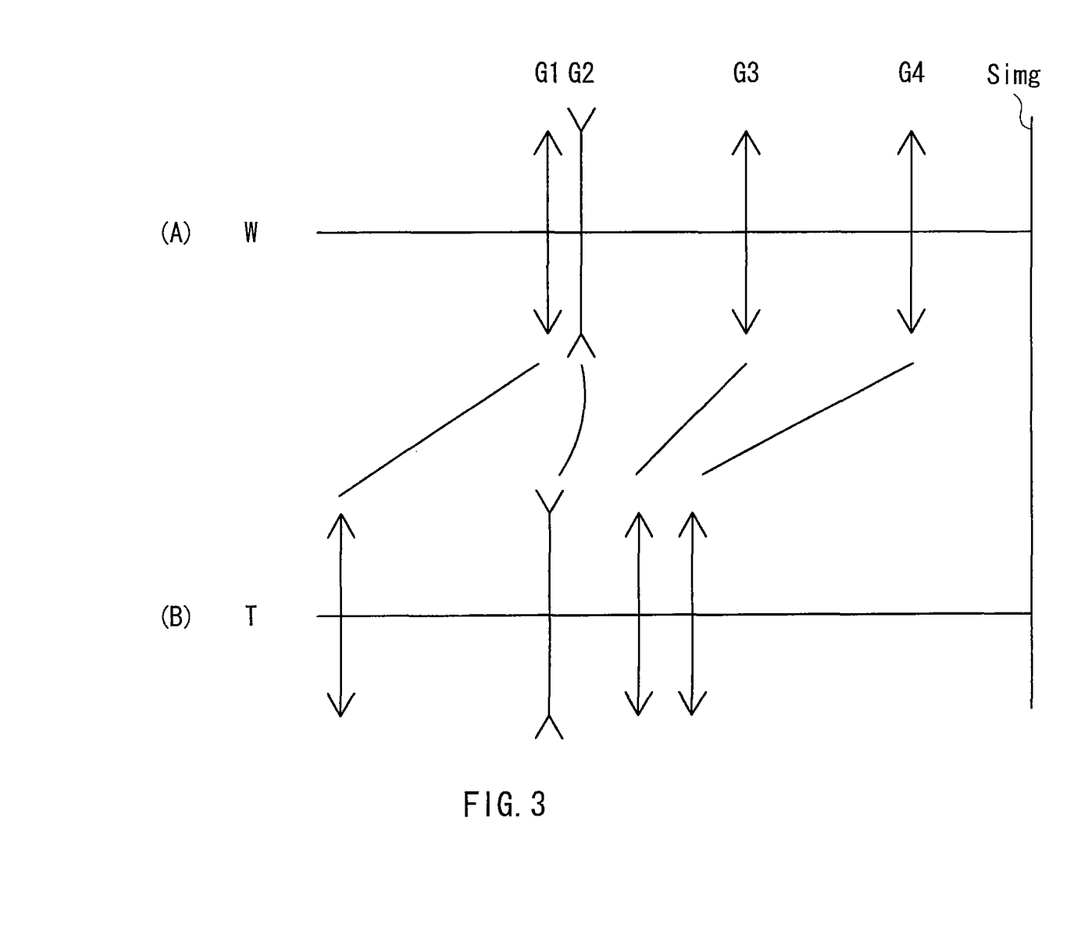
FIG. 3 is an explanatory diagram illustrating refractive power arrangements of respective lens groups with states of the lens groups moving with a change in magnification, where a part (A) illustrates a wide-angle end state, and a part (B) illustrates a telephoto end state.
Figure 4A:
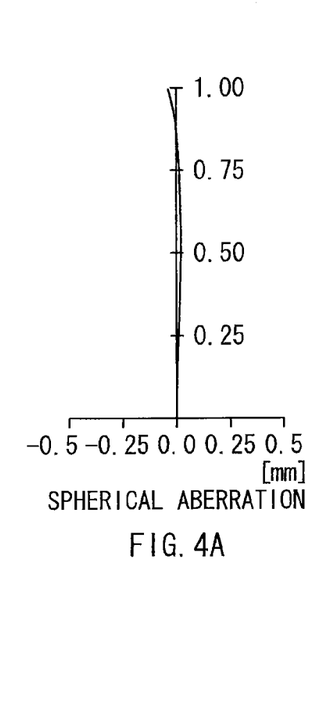
FIGS. 4A, 4B, 4C, and 4D are aberration diagrams illustrating spherical aberration, astigmatism, distortion, and lateral aberration, respectively, in a wide-angle end state of a zoom lens corresponding to Numerical Example 1.
Figure 4B:
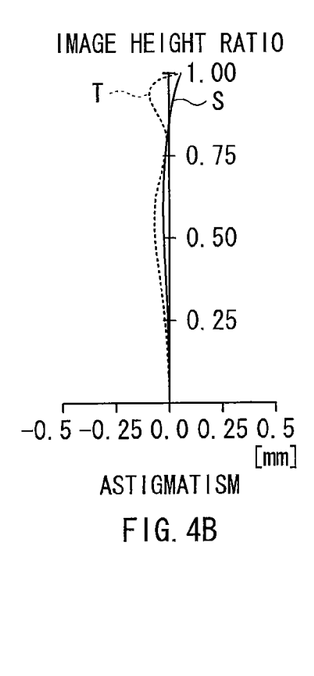
Figure 4C:
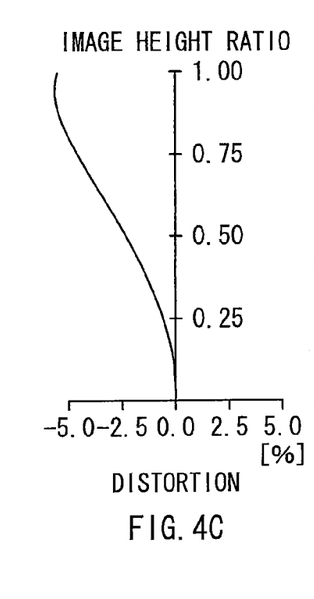
Figure 4D:
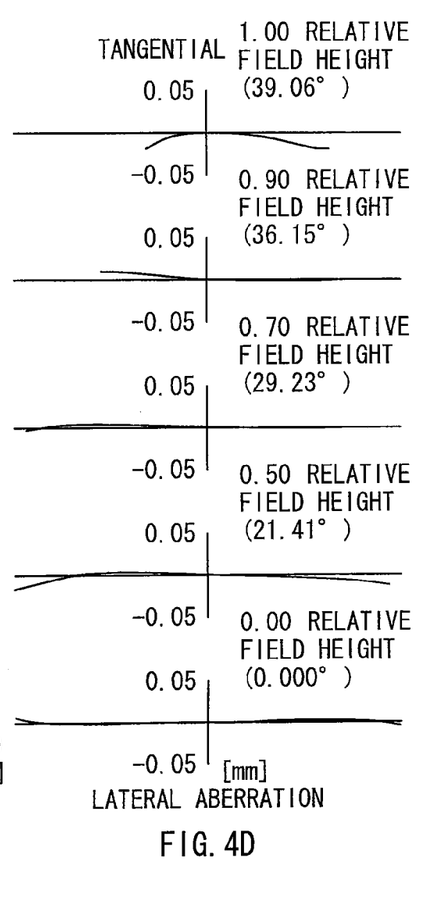
Figure 5A:
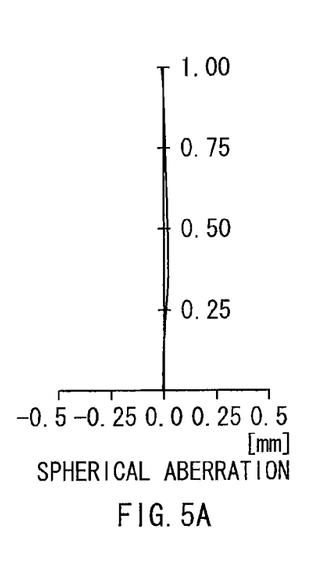
FIGS. 5A, 5B, 5C, and 5D are aberration diagrams illustrating spherical aberration, astigmatism, distortion, and lateral aberration, respectively, in an intermediate focal length state of the zoom lens corresponding to Numerical Example 1.
Figure 5B:
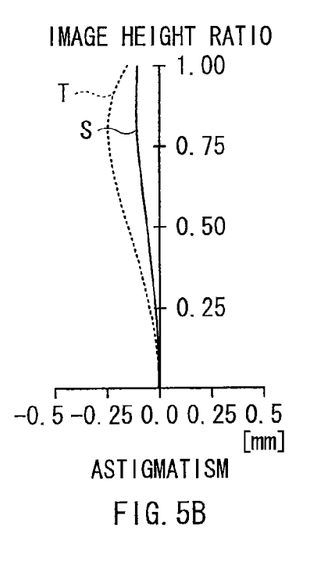
Figure 5C:
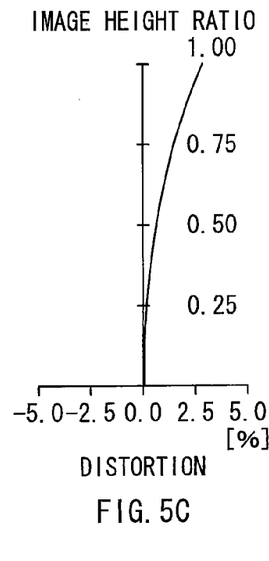
Figure 5D:
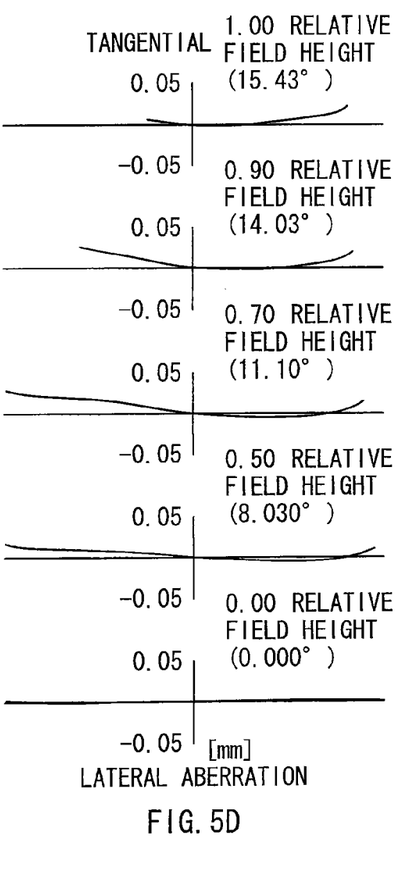
Figure 6A:
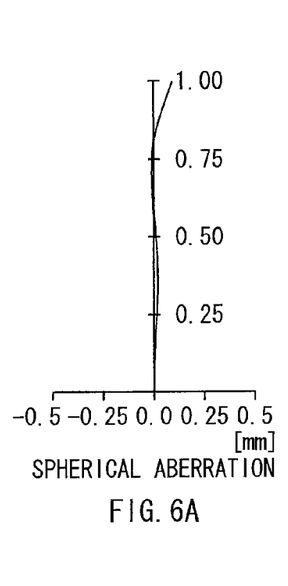
FIGS. 6A, 6B, 6C, and 6D are aberration diagrams illustrating spherical aberration, astigmatism, distortion, and lateral aberration, respectively, in a telephoto end state of the zoom lens corresponding to Numerical Example 1.
Figure 6B:
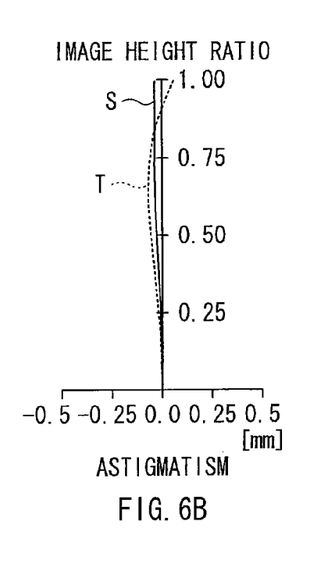
Figure 6C:
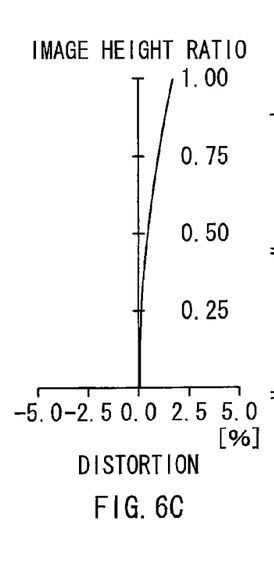
Figure 6D:
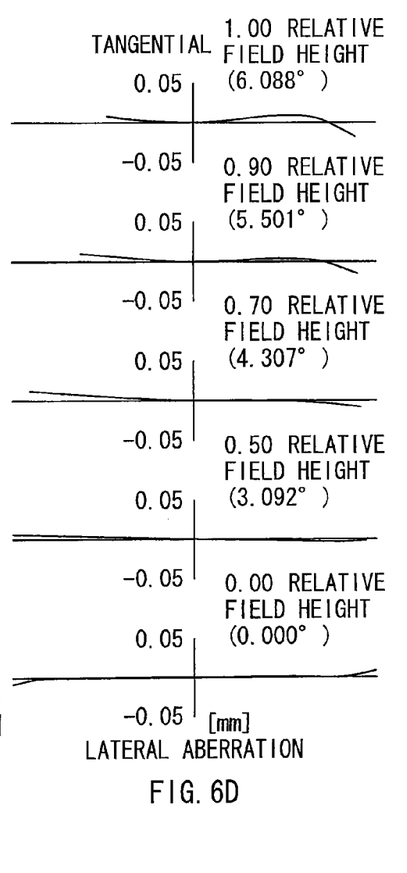
Figure 7A:
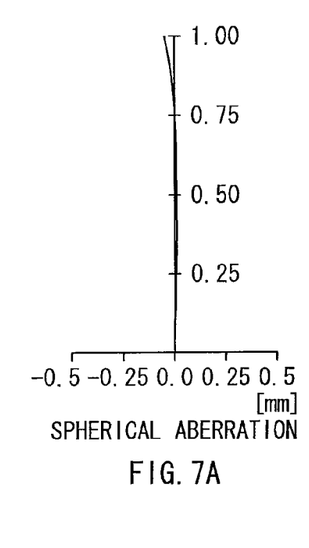
FIGS. 7A, 7B, 7C, and 7D are aberration diagrams illustrating spherical aberration, astigmatism, distortion, and lateral aberration, respectively, in a wide-angle end state of a zoom lens corresponding to Numerical Example 2.
Figure 7B:
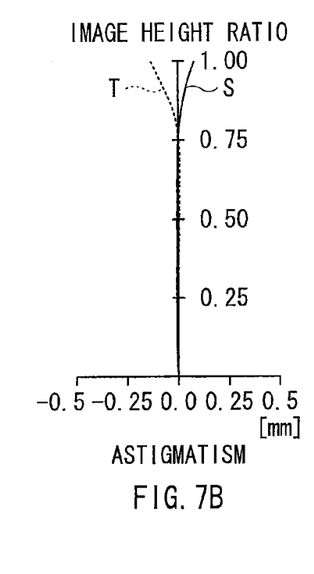
Figure 7C:
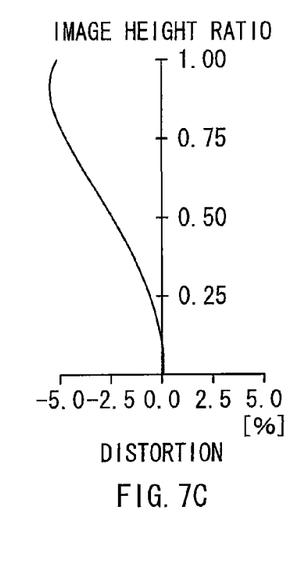
Figure 7D:
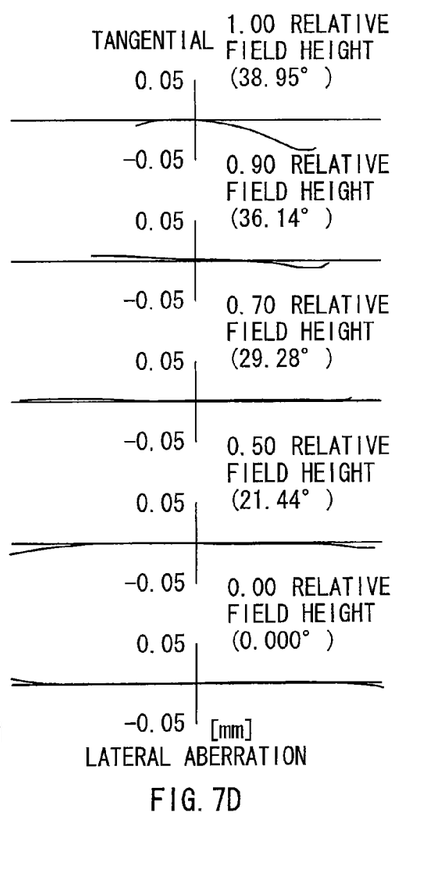
Figures 8A, 8B:
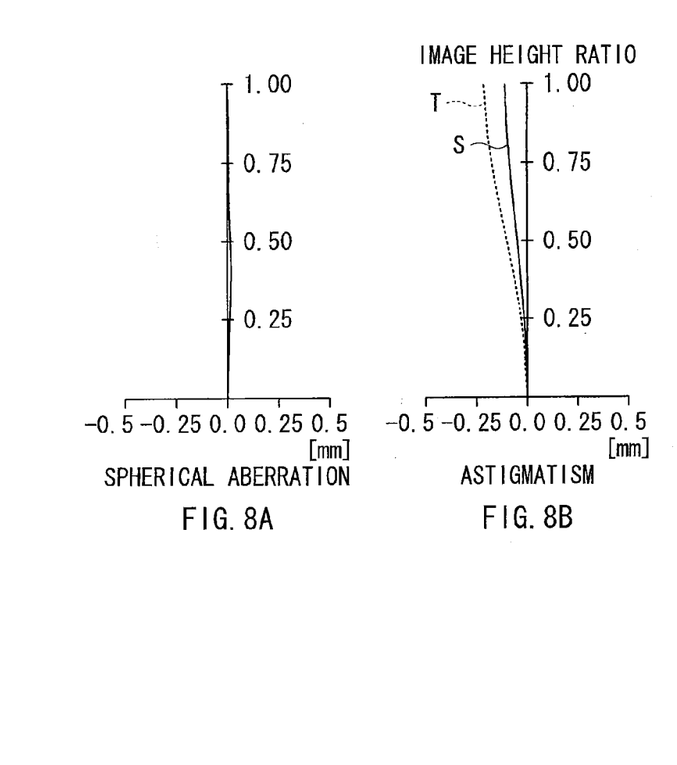
FIGS. 8A, 8B, 8C, and 8D are aberration diagrams illustrating spherical aberration, astigmatism, distortion, and lateral aberration, respectively, in an intermediate focal length state of the zoom lens corresponding to Numerical Example 2.
Figure 8C:
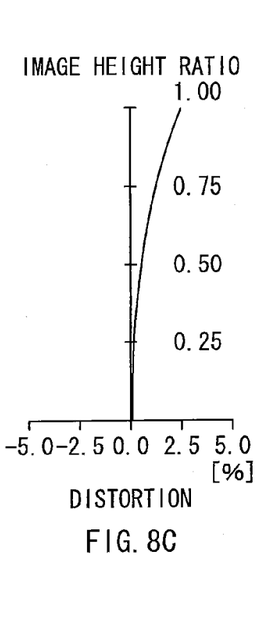
Figure 8D:
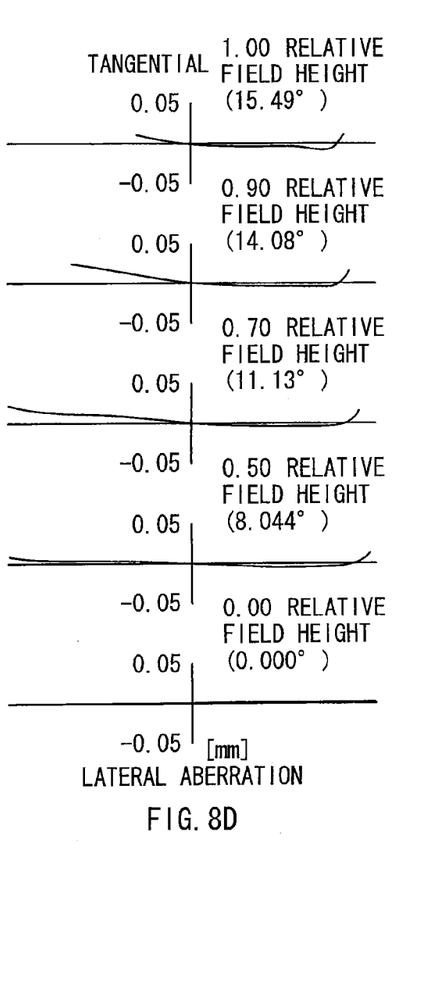
Figure 9A:
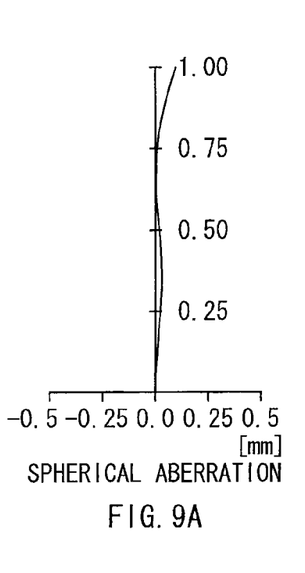
FIGS. 9A, 9B, 9C, and 9D are aberration diagrams illustrating spherical aberration, astigmatism, distortion, and lateral aberration, respectively, in a telephoto end state of the zoom lens corresponding to Numerical Example 2.
Figure 9B:
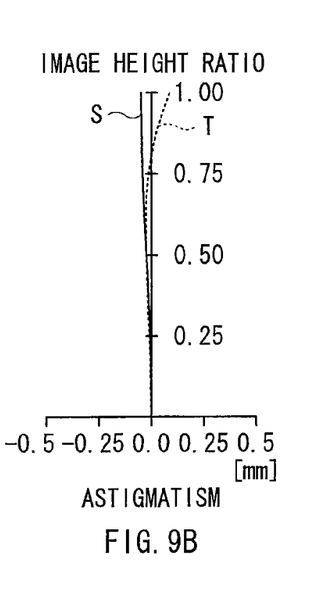
Figure 9C:
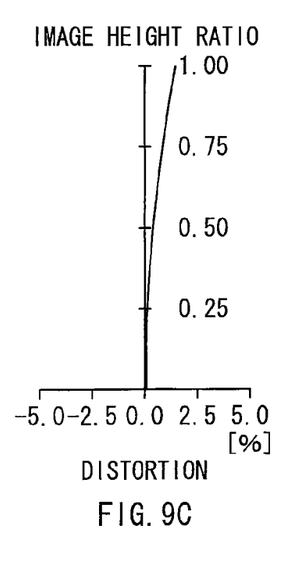
Figure 9D:
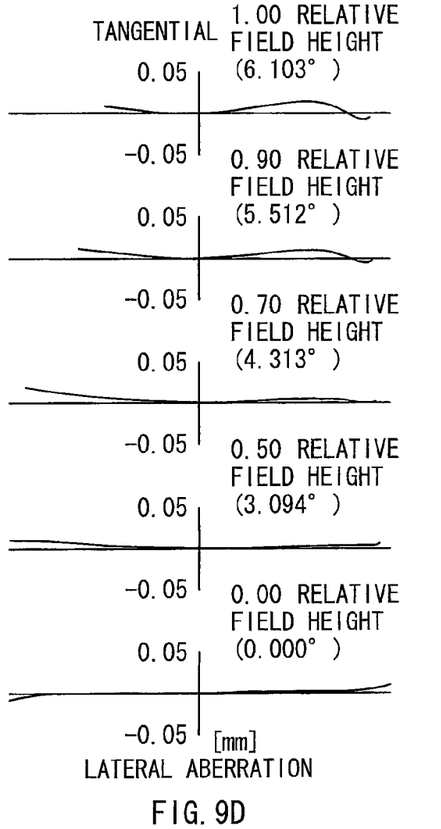

Parts (A) and (B) in FIG. 3 illustrate refractive power arrangements of respective lens groups with states of the lens groups moving with a change in magnification. As illustrated in the parts (A) and (B) in FIG. 3, zooming is performed through varying a distance between adjacent lens groups of the first to fourth lens groups G1 to G4. More specifically, when the lens position state varies from a wide-angle end state (refer to the part (A) in FIG. 3) in which a focal length of the zoom lens is shortest to a telephoto end state (refer to the part (B) in FIG. 3) in which the focal length is longest, all of the lens groups are so moved as to increase the distance D5 between the first lens group G1 and the second lens group G2, and as to decrease the distance D14 between the second lens group G2 and the third lens group G3 and the distance D20 between the third lens group G3 and the fourth lens group G4.

The zoom lens focuses on an object in a close range through moving, for example, the second lens group G2 along the optical axis Z1.

Moreover, the zoom lens according to the embodiment preferably satisfies the following predetermined conditional expressions.

[Configurations and Functions of Respective Lens Groups]

Next, configurations and functions of respective lens groups will be described below.

(First Lens Group G1 and Second Lens Group G2)

At a wide-angle end, a distance between the first lens group G1 and the second lens group G2 is narrower. Since a composite focal length of these two groups is a negative focal length, a combination of the first lens group G1 and the second lens group G2 is considered as one negative lens group. In this case, a front group virtually serves as a negative lens group, thereby forming a lens configuration suitable for wide angle. At a telephoto end, the distance between the first lens group G1 and the second lens group G2 is wider. In this case, since the first lens group G1 has positive refractive power and the second lens group G2 has negative refractive power, the arrangement of both groups is of a telephoto type, and a lens configuration suitable for a telephoto lens is formed.

(Second Lens Group G2 and Third Lens Group G3)

At the wide-angle end, a distance between the second lens group G2 and the third lens group G3 is wider. Therefore, an off-axial light flux passing through the second lens group G2 is departed from the optical axis Z1, and as a result, on-axial aberration and off-axial aberration are corrected independently of each other. At the telephoto end, the distance between the second lens group G2 and the third lens group G3 is narrower. Therefore, the off-axial light flux passing through the second lens group G2 comes close to the optical axis Z1, and off-axial aberration is corrected at a position different from that at the wide-angle end.

(Third Lens Group G3 and Fourth Lens Group G4)

Since the third lens group G3 and the fourth lens group G4 both have positive refractive power, they do not contribute largely to changing magnification even if a distance between them is varied. However, when the distance between them is varied, off-axial aberration, in particular, curvature of field is favorably corrected.

The third lens group G3 and the fourth lens group G4 preferably satisfy the following conditions [I] and [II].

[I] The third lens group G3 includes, in order from the object side, a first lens L31 as a third negative meniscus lens in the present disclosure which has a convex surface facing the object side, a second lens L32 as a positive biconvex lens, and a third lens L33 as a fourth negative meniscus lens in the present disclosure which has a convex surface facing an image side, and the first lens L31 and the second lens L32 are cemented together to form a positive cemented lens.

[II] The fourth lens group G4 includes, in order from the object side, a first lens L41 as a first positive biconvex lens, a second lens L42 as a first negative meniscus lens in the present disclosure which has a convex surface facing the object side, a third lens L43 as a second negative meniscus lens in the present disclosure which has a convex surface facing the object side, and a fourth lens L44 as a second positive biconvex lens, and the third lens L43 and the fourth lens L44 are cemented together to form a positive cemented lens.

The condition [I] is a condition for aberration correction and error sensitivity reduction in the third lens group G3. Typically, the refractive power of a surface is increased with a decrease in the radius of curvature; therefore, performance degradation when an eccentric error occurs is increased. In the third lens group G3, a high-refractive-index glass material with a refractive index of 1.8 or over is used for the first lens L31 which is negative; therefore, the radius of curvature of an object-side surface of the first lens L31 is increased, and as a result, the performance degradation when the error occurs is reduced. Moreover, when a low-refractive-index glass material is used for the second lens L32, aberration correction is performed on a surface cemented to the first lens L31 of the second lens L32 with use of a difference in refractive index between the lenses L31 and L32. Therefore, appropriate aberration correction is possible without increasing the number of lens elements. Moreover, when a negative meniscus lens with a convex surface facing the image side is provided as the third lens L33, the positive refractive power of the whole third lens group G3 is reduced, and relative sensitivity of the third lens group G3 to the fourth lens group G4 is reduced.

The condition [II] is a condition for achieving a balance between simplification of the fourth lens group G4 and aberration correction. The configuration of the fourth lens group G4 is especially important for optical performance in the four-group zoom lens. As a result, approaches such as increasing the number of lenses or using many aspheric surfaces are taken to improve performance. In the embodiment, aberration is favorably corrected through disposing the first lens L41 which is positive and the second lens L42 which is negative in an appropriate refractive power arrangement. At this time, when an aspheric surface is provided to an object-side surface of the second lens L42 which is negative, on-axial aberration is corrected more favorably. Moreover, when the cemented lens configured of the third lens L43 which is negative and the fourth lens L44 which is positive is formed as a so-called achromatic lens with a small refractive index difference and a large Abbe number difference, chromatic aberration at the telephoto end is favorably corrected.

[Description of Conditional Expressions]

In the zoom lens according to the embodiment, when the configurations of respective lens groups are optimized to satisfy one of the following conditional expressions, preferably a combination of two or more of the following conditional expressions, better performance is obtainable.

The zoom lens according to the embodiment preferably satisfies the following conditional expression (1):

$$2 \leq f3/f4 < 3 \tag{1}$$

where f3 is a focal length of the third lens group G3, and f4 is a focal length of the fourth lens group G4.

The conditional expression (1) specifies a focal length ratio between the third lens group G3 and the fourth lens group G4, and relates to downsizing. In the case where the focal length ratio is lower than a lower limit of the conditional expression (1), a convergence function by the fourth lens group G4 is weakened to increase a total optical length, and as a result, downsizing is not achieved. In the case where the focal length ratio is larger than an upper limit of the conditional expression (1), the refractive power of the third lens group G3 is weakened to increase a height of a light ray passing through the third lens group G3, thereby causing a disadvantage in downsizing in a diameter direction.

It is to be noted that a value range of the above-described conditional expression (1) is preferably set to the following conditional expression (1)':

$$2 \leq f3/f4 < 2.5 \tag{1}'$$

The zoom lens according to the embodiment preferably satisfies the following conditional expression (2):

$$4 < ft/R31 < 5 \tag{2}$$

where ft is a focal length of a whole system of the zoom lens at the telephoto end, and R31 is a radius of curvature of a lens surface located closest to the object side of the third lens group G3.

The conditional expression (2) specifies the focal length of the whole system of the zoom lens at the telephoto end and the radius of curvature of the lens surface located closest to the object side of the third lens group G3, and expresses details of the above-described condition [I] in numerical form. In the case where ft/R31 is lower than a lower limit of the conditional expression (2), the radius of curvature of the lens surface located closest to the object side of the third lens group G3 is increased to make the refractive power of the lens surface insufficient, and aberration is not appropriately corrected accordingly. In the case where ft/R31 is higher than an upper limit of the conditional expression (2), the radius of curvature of the lens surface is too small; therefore, the refractive power of the lens surface is increased to increase eccentric sensitivity of the lens surface. As a result, an eccentric error caused at the time of manufacturing badly degrades optical performance.

It is to be noted that a value range of the above-described conditional expression (2) is preferably set to the following conditional expression (2)':

$$4.5 < ft/R31 < 4.9 \tag{2}'$$

The zoom lens according to the embodiment preferably satisfies the following conditional expression (3):

$$0 < |(R31+R35)/(R31-R35)| < 1 \tag{3}$$

where R31 is the radius of curvature of the lens surface located closest to the object side of the third lens group G3, and R35 is a radius of curvature of a lens surface located closest to an image side of the third lens group G3.

The conditional expression (3) specifies the radii of curvature of the lens surface located closest to the object side and the lens surface located closest to the image side of the third lens group G3 to favorably correct aberration and to reduce performance degradation when an error occurs. In the case where |(R31+R35)/(R31−R35)| is lower than a lower limit of the conditional expression (3), the radius of curvature of the lens surface located closest to the image side of the third lens group G3 is excessively reduced with respect to the radius of curvature of the lens surface located closest to the object side of the third lens group G3. As a result, it is difficult to favorably correct on-axial aberration and off-axial aberration. In the case where |(R31+R35)/(R31−R35)| is higher than an upper limit of the conditional expression (3), a concave surface facing the image side is formed by the radius of curvature of the lens surface located closest to the image side of the third lens group G3; therefore, the zoom lens has a configuration not satisfying the above-described condition [I]. As a result, relative sensitivity of the third lens group G3 to the fourth lens group G4 is increased to increase performance degradation when an error occurs.

It is to be noted that a value range of the above-described conditional expression (3) is preferably set to the following conditional expression (3)':

$$0.1<|(R31+R35)/(R31-R35)|<0.5 \quad (3)'$$

The zoom lens according to the embodiment preferably satisfies the following conditional expression (4):

$$2<f4r/f4<3 \quad (4)$$

where f4r is a focal length of a cemented lens in the fourth lens group G4, and f4 is a focal length of the fourth lens group G4.

The conditional expression (4) specifies a focal length ratio between the fourth lens group G4 and the cemented lens in the fourth lens group G4. In the case where the focal length ratio is lower than a lower limit of the conditional expression (4), the refractive power of the cemented lens is increased to increase eccentric sensitivity, and as a result, an eccentric error caused at the time of manufacturing badly degrades optical performance. In the case where the focal length ratio is higher than an upper limit of the conditional expression (4), the refractive power of the cemented lens is excessively reduced; therefore, it is difficult to favorably correct off-axial aberration.

It is to be noted that a value range of the above-described conditional expression (4) is preferably set to the following conditional expression (4)':

$$2.3<f4r/f4<3 \quad (4)'$$

The zoom lens according to the embodiment preferably satisfies the following conditional expression (5):

$$|1/(f43 \times v43)+1/(f44 \times v44)|<1 \times 10^{-4} \quad (5)$$

where f43 is a focal length of the second negative meniscus lens in the fourth lens group G4, v43 is an Abbe number of the second negative meniscus lens in the fourth lens group G4, f44 is a focal length of the second positive lens in the fourth lens group G4, and v44 is an Abbe number of the second positive lens in the fourth lens group G4.

The conditional expression (5) is a conditional expression relating to chromatic aberration reduction in the cemented lens described in the above-described condition [II]. When the conditional expression (5) is satisfied, on-axial chromatic aberration at the telephoto end of a high-power zoom lens is favorably corrected.

The zoom lens according to the embodiment preferably satisfies the following conditional expression (6):

$$2<ft/dX1<3 \quad (6)$$

where dX1 is a moving distance in an optical axis direction of the first lens group G1 when zooming is performed from the wide-angle end to the telephoto end.

The conditional expression (6) specifies the focal length of the whole system of the zoom lens at the telephoto end and the moving distance in the optical axis direction of the first lens group G1 when zooming is performed from the wide-angle end to the telephoto end. In the case where ft/dX1 is lower than a lower limit of the conditional expression (6), the moving distance in the optical axis direction of the first lens group G1 is increased. As a result, an off-axial light flux passing through the first lens group G1 is departed from the optical axis Z1, thereby increasing a lens diameter of the first lens group G1. In the case where ft/dX1 is higher than an upper limit of the conditional expression (6), the moving distance in the optical axis direction of the first lens group G1 is reduced. As a result, to secure a desired zoom ratio, it is necessary to increase a moving distance in the optical axis direction of the second lens group G2, and as a result, the entire length of the zoom lens at the wide-angle end is increased.

It is to be noted that a value range of the above-described conditional expression (6) is preferably set to the following conditional expression (6)':

$$2.2<ft/dX1<2.4 \quad (6)'$$

As described above, in the embodiment, the zoom lens has a positive-negative-positive-positive four-group zoom configuration, and the configurations of respective lens groups are optimized; therefore, for example, a high-power (for example, magnification from 7 to 8.5), but small, lightweight, and high-performance zoom lens suitable as an interchangeable lens attachable to, for example, a digital single-lens reflex camera is achievable.

[Application Example to Image Pickup Unit]

Figure 10:
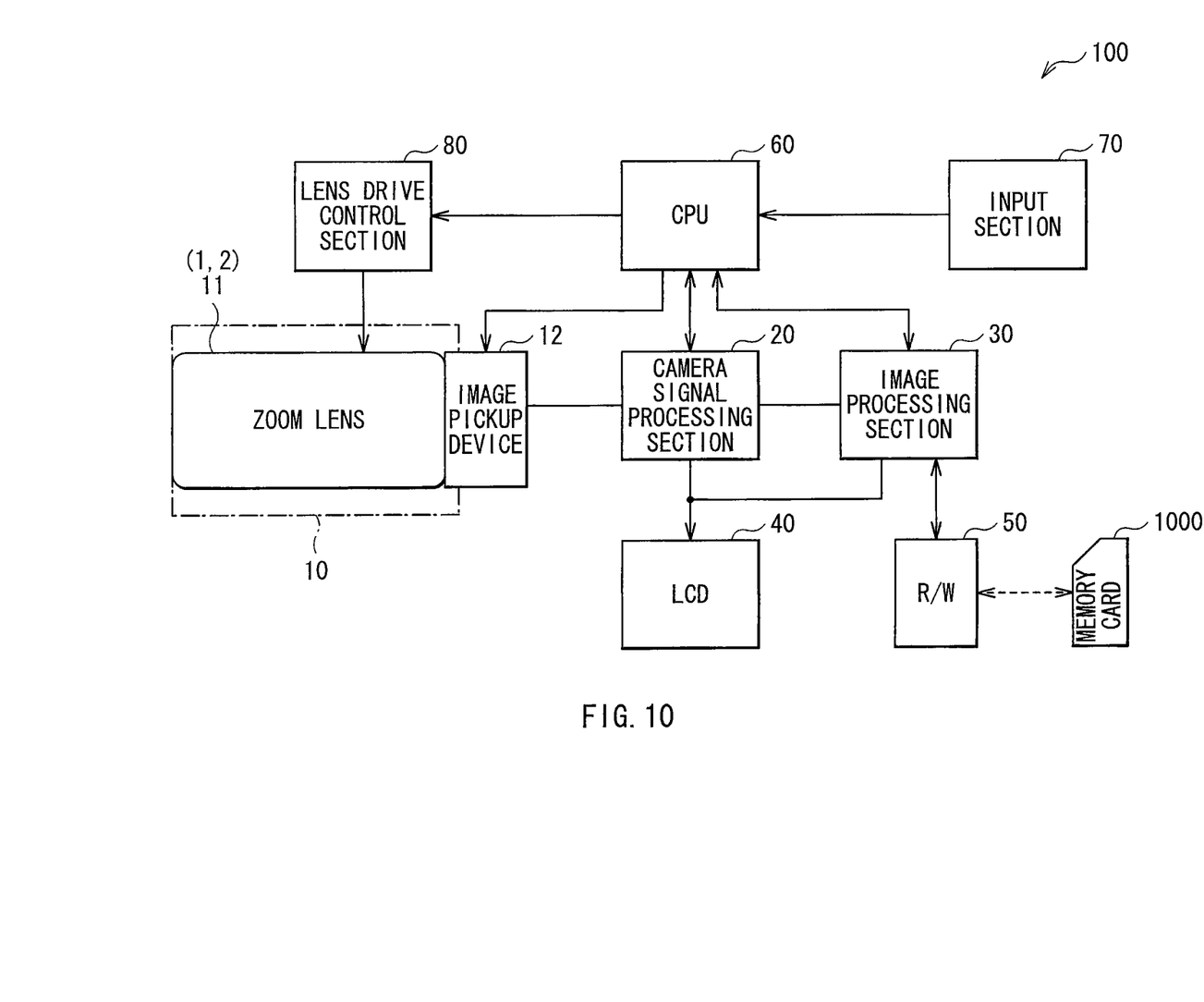
FIG. 10 is a block diagram illustrating a configuration example of an image pickup unit.

FIG. 10 illustrates a configuration example of an image pickup unit 100 to which the zoom lens according to the embodiment is applied. The image pickup unit 100 is, for example, a digital still camera, and includes a camera block 10, a camera signal processing section 20, an image processing section 30, an LCD (Liquid Crystal Display) 40, an R/W (reader/writer) 50, a CPU (Central Processing Unit) 60, and an input section 70.

The camera block 10 has an image pickup function, and includes an optical system including a zoom lens 11 (the zoom lens 1 or 2 illustrated in FIGS. 1A to 1C or FIGS. 2A to 2C) as an image pickup lens and an image pickup device 12 such as a CCD (Charge Coupled Device) or a CMOS (Complementary Metal Oxide Semiconductor). The image pickup device 12 outputs an image pickup signal (an image signal) based on an optical image formed by the zoom lens 11 through converting the optical image into an electrical signal.

The camera signal processing section 20 performs, on the image signal output from the image pickup device 12, various kinds of signal processing such as analog-digital conversion, noise removal, image quality correction, and conversion to a luminance-chrominance signal.

The image processing section 30 performs a process of recording and reproducing the image signal, and performs compression-coding and decompression-decoding on the image signal based on a predetermined image data format, conversion of data specifications such as resolution, and the like.

The LCD 40 has a function of displaying a state of operation on the input section 70 by a user and various data such as a taken image. The R/W 50 writes image data coded by the image processing section 30 to a memory card 1000 and reads image data recoded on the memory card 1000. The memory card 1000 is, for example, a semiconductor memory attachable to and detachable from a slot connected to the R/W 50.

The CPU 60 functions as a control processing section controlling each circuit block included in the image pickup unit 100, and controls each circuit block based on an instruction input signal from the input section 70 or the like. The input section 70 is configured of various switches and the like allowing a user to perform a desired operation, and may include, for example, a shutter release button for performing a shutter operation, a selector switch for selecting an operation mode, and the like. The input section 70 outputs an instruction input signal corresponding to an operation by the user to the CPU 60. The lens drive control section 80 controls driving of lenses disposed in the camera block 10, and controls a motor or the like (not illustrated) driving each of the lenses of the zoom lens 11 based on a control signal from the CPU 60.

An operation in the image pickup unit 100 will be described below. In a standby state for photographing, under control of the CPU 60, an image signal taken in the camera block 10 is output to the LCD 40 through the camera signal processing section 20, and then the image signal is displayed as a camera-through image. Moreover, when an instruction input signal for zooming or focusing is input from the input section 70, the CPU 60 outputs a control signal to the lens drive control section 80, and a predetermined lens of the zoom lens 11 is moved based on control of the lens drive control section 80.

When a shutter (not illustrated) in the camera block 10 is operated by an instruction input signal from the input section 70, a taken image signal is output from the camera signal processing section 20 to the image processing section 30, and the image signal is compression-coded to be converted into digital data in a predetermined data format. The converted data is output to the R/W 50, and then is written to the memory card 1000.

It is to be noted that focusing is performed through moving a predetermined lens of the zoom lens 11 by the lens drive control section 80 based on a control signal from the CPU 60, for example, when the shutter release button of the input section 70 is pressed halfway or is fully pressed for recording (photographing).

When image data recorded on the memory card 1000 is reproduced, the predetermined image data is read from the memory card 1000 by the R/W 50 according to an operation on the input section 70, and the image data is decompression-decoded by the image processing section 30 to form a reproduced image signal. Then, the reproduced image signal is output to the LCD 40 to be displayed.

It is to be noted that, in the above-described embodiment, an example in which the image pickup unit is applied as a digital still camera is described; however, the scope of application of the image pickup unit is not limited to the digital still camera. The image pickup unit may be applied as other various electronic apparatuses, for example, a camera with interchangeable lenses, a digital video camera, and a cellular phone equipped with a digital video camera or the like, and a PDA (personal Digital Assistance) equipped with a digital video camera or the like.

EXAMPLES

Next, specific numerical examples of the zoom lens according to the embodiment will be described below. It is to be noted that the meanings of symbols illustrated in the following tables and description are as follows. "Si" is the surface number of an i-th surface incremented by one from a surface of a component located closest to the object side as a first surface toward the image side, and "ri" is a radius (mm) of curvature of the i-th surface, "Di" is a distance (mm) on an optical axis between the i-th surface and an i+1-th surface, "Ndi" is a refractive index value at a d-line (with a wavelength of 587.6 nm) of an optical element material (a medium) having the i-th surface, "vdi" is an Abbe number at the d-line of the optical element material having the i-th surface. Moreover, Fno is an F-number, f is the focal length of the whole system of the zoom lens, and ω is a half angle of view. A surface with "STO" following its surface number is a stop surface.

In respective examples, the shape of an aspheric surface is represented by the following expression. In data of an aspherical coefficient, a symbol "E" indicates that a numerical value following "E" is an exponent of a power having 10 as a base, and that a numerical value represented by an exponential function of 10 as a base is multiplied by a numerical value before "E". For example, "1.0E-05" means "1.0×10$^{-5}$".
(Expression of Aspheric Surface)

$$x=cy^2/(1+(1-(1+k)c^2y^2)^{1/2})+Ay^4+By^6+\ldots$$

where y is a height from the optical axis Z1, x is a sag amount, c is curvature, k is a conic constant, and A, B, ... each are an aspherical coefficient.

The zoom lenses 1 and 2 according to the following numerical examples each were substantially configured of four lens groups, i.e., the first lens group G1 having positive refractive power, the second lens group G2 having negative refractive power, the third lens group G3 having positive refractive power, and the fourth lens group G4 having positive refractive power which were arranged in order from the object side. When the lens position state varied from the wide-angle end state to the telephoto end state, all of the lens groups were so moved as to increase the distance D5 between the first lens group G1 and the second lens group G2 and as to decrease the distance D14 between the second lens group G2 and the third lens group G3 and the distance D20 between the third lens group G3 and the fourth lens group G4. The aperture stop St was located closest to the object side of the third lens group G3, and moved together with the third lens group G3 when varying the lens position state with a change in magnification.

The first lens group G1 included, in order from the object side, a cemented lens configured of a negative lens L11 in a meniscus shape with a convex surface facing the object side and a positive lens L12 with a convex surface facing the object side, and a positive lens in a meniscus shape with a convex surface facing the object side. The second lens group G2 included a first negative lens L21 in a meniscus shape with a convex surface facing the object side, a second negative lens L22 in a biconcave shape, a positive lens L23 in a biconvex shape, and a third negative lens L24 in a meniscus shape with a concave surface facing the object side.

The third lens group G3 included, in order from the object, side a first lens L31 as a first negative meniscus lens with a convex surface facing the object, a second lens L32 as a positive biconvex lens, and a third lens L33 as a second negative meniscus lens with a convex surface facing the image side. The first lens L31 and the second lens L32 were cemented together to form a positive cemented lens.

The fourth lens group G4 included, in order from the object side, a first lens L41 as a first positive biconvex lens, a second lens L42 as a first negative meniscus lens with a convex surface facing the object side, a third lens L43 as a second negative meniscus lens with a convex surface facing the object side, and a fourth lens L44 as a second positive biconvex lens. The third lens L43 and the fourth lens L44 were cemented together to form a positive cemented lens.

Numerical Example 1

Tables 1 to 3 illustrate specific lens data corresponding to the zoom lens 1 according to the first configuration example illustrated in FIGS. 1A to 1C. More specifically, Table 1 illustrates a basic lens data, Table 2 illustrates data of the aspheric surface, and Table 3 illustrates other data. In the zoom lens 1, respective lens groups moved with a change in magnification; therefore, a surface distance between adjacent lens groups of the lens groups was variable. Data of the variable surface distance is illustrated in Table 3. Table 3 also illustrate values of Fno, f, and ω.

TABLE 1

Example 1

| Lens Group | Si | ri | Di | Ndi | vdi |
|---|---|---|---|---|---|
| G1 | 1 | 133.241 | 1.30 | 1.84666 | 23.78 |
| | 2 | 61.395 | 6.94 | 1.72916 | 54.67 |
| | 3 | 732.741 | 0.10 | | |
| | 4 | 63.071 | 4.00 | 1.77250 | 49.62 |
| | 5 | 175.580 | D5 | | |
| G2 | 6 | 98.407 | 0.15 | 1.53420 | 41.73 |
| | 7 | 60.000 | 0.90 | 1.83481 | 42.72 |
| | 8 | 14.443 | 6.07 | | |
| | 9 | −29.082 | 0.90 | 1.77250 | 49.62 |
| | 10 | 51.963 | 0.25 | | |
| | 11 | 35.964 | 4.74 | 1.84666 | 23.78 |
| | 12 | −35.964 | 1.73 | | |
| | 13 | −19.265 | 0.90 | 1.77250 | 49.62 |
| | 14 | −52.037 | D14 | | |
| | 15 (STO) | ∞ | 1.00 | | |
| G3 | 16 | 28.265 | 1.30 | 1.83481 | 42.72 |
| | 17 | 18.569 | 4.77 | 1.56384 | 60.83 |
| | 18 | −53.766 | 1.02 | | |
| | 19 | −23.678 | 0.90 | 1.83481 | 42.72 |
| | 20 | −39.467 | D20 | | |
| G4 | 21 | 20.064 | 7.00 | 1.49700 | 81.61 |
| | 22 | −38.092 | 1.30 | | |
| | 23 | 43.493 | 0.15 | 1.53420 | 41.73 |
| | 24 | 68.034 | 0.90 | 1.83400 | 37.34 |
| | 25 | 22.160 | 4.12 | | |
| | 26 | 104.165 | 1.72 | 1.51742 | 52.15 |
| | 27 | 21.556 | 6.00 | 1.48749 | 70.44 |
| | 28 | −68.385 | | | |

TABLE 2

Example 1

| | S6 | | S23 |
|---|---|---|---|
| k | 1 | k | −3.15 |
| A | 1.728E−05 | A | −4.010E−05 |
| B | −1.468E−08 | B | −8.455E−08 |
| C | −4.855E−11 | C | −8.174E−10 |
| D | 7.204E−13 | D | 5.619E−12 |
| | | E | −2.246E−14 |

TABLE 3

Example 1

| | Wide-angle end | Intermediate | Telephoto end |
|---|---|---|---|
| f | 18.56 | 50.01 | 130.89 |
| Fno | 3.61 | 4.43 | 5.79 |
| 2ω | 78.1 | 30.9 | 12.2 |
| D5 | 2.02 | 24.48 | 42.45 |
| D14 | 21.83 | 9.26 | 1.40 |
| D20 | 8.00 | 3.15 | 1.00 |

Numerical Example 2

Tables 4 to 6 illustrate specific lens data corresponding to the zoom lens 2 according to the second configuration example illustrated in FIGS. 2A to 2C. More specifically, Table 4 illustrates basic lens data, Table 5 illustrates data of the aspheric surface, and Table 6 illustrates other data. In the zoom lens 2, respective lens groups moved with a change in magnification; therefore, a surface distance between adjacent lens groups of the lens groups was variable. Data of the variable surface distance is illustrated in Table 6. Table 6 also illustrate values of Fno, f, and ω.

TABLE 4

Example 2

| Lens Group | Si | ri | Di | Ndi | vdi |
|---|---|---|---|---|---|
| G1 | 1 | 231.944 | 1.30 | 1.84666 | 23.78 |
| | 2 | 74.914 | 7.00 | 1.72916 | 54.67 |
| | 3 | −336.238 | 0.10 | | |
| | 4 | 50.581 | 4.00 | 1.77250 | 49.62 |
| | 5 | 90.934 | D5 | | |
| G2 | 6 | 82.549 | 0.15 | 1.53420 | 41.73 |
| | 7 | 61.894 | 0.90 | 1.83481 | 42.72 |
| | 8 | 14.469 | 6.59 | | |
| | 9 | −29.098 | 0.90 | 1.77250 | 49.62 |
| | 10 | 47.579 | 0.13 | | |
| | 11 | 34.238 | 4.90 | 1.84666 | 23.78 |
| | 12 | −34.238 | 1.52 | | |
| | 13 | −20.322 | 0.90 | 1.77250 | 49.62 |
| | 14 | −67.571 | D14 | | |
| | 15 (STO) | ∞ | 1.00 | | |
| G3 | 16 | 26.805 | 0.90 | 1.83481 | 42.72 |
| | 17 | 17.324 | 4.55 | 1.56883 | 56.04 |
| | 18 | −58.043 | 0.97 | | |
| | 19 | −25.354 | 0.90 | 1.83400 | 37.34 |
| | 20 | −44.571 | D20 | | |
| G4 | 21 | 20.757 | 6.96 | 1.49700 | 81.61 |
| | 22 | −38.650 | 1.30 | | |
| | 23 | 43.045 | 0.15 | 1.53420 | 41.73 |
| | 24 | 81.914 | 0.90 | 1.83400 | 37.34 |
| | 25 | 22.942 | 3.64 | | |
| | 26 | 167.578 | 1.96 | 1.51742 | 52.15 |
| | 27 | 28.587 | 5.32 | 1.49700 | 81.61 |
| | 28 | −55.422 | | | |

TABLE 5

Example 2

| | S6 | | S23 |
|---|---|---|---|
| k | −0.65 | k | −2.58 |
| A | 1.390E−05 | A | −3.908E−05 |
| B | −1.777E−08 | B | −5.932E−08 |
| C | 3.770E−11 | C | −1.096E−09 |
| D | 1.991E−13 | D | 1.064E−11 |
| | | E | −4.813E−14 |

TABLE 6

Example 2

| | Wide-angle end | Intermediate | Telephoto end |
|---|---|---|---|
| f | 18.55 | 50.00 | 130.88 |
| Fno | 3.61 | 4.43 | 5.77 |
| 2ω | 77.9 | 31.0 | 12.2 |
| D5 | 2.02 | 24.48 | 42.45 |
| D14 | 21.83 | 9.26 | 1.40 |
| D20 | 8.00 | 3.15 | 1.00 |

[Other Numerical Data of Respective Examples]

Table 7 illustrates values of the above-described conditional expressions in respective numerical examples. As illustrated in Table 7, the values of respective numerical examples fall in value ranges of the respective conditional expressions.

TABLE 7

| No. | Conditional Expression | Example 1 | Example 2 |
|---|---|---|---|
| (1) | f3/f4 | 2.18 | 2.18 |
| (2) | ft/R31 | 4.6 | 4.9 |
| (3) | \|(R35 + R31)/(R35 − R31)\| | 0.17 | 0.25 |
| (4) | f4r/f4 | 2.54 | 2.39 |
| (5) | \|1/(f43 × v43) + 1/(f44 × v44)\| | 5.1E−05 | 3.0E−05 |
| (6) | ft/dX1 | 2.26 | 2.26 |

[Aberration Performance]

FIGS. 4A to 4D to FIGS. 9A to 9D illustrate aberration performance of respective numerical examples. FIGS. 4A to 4D to FIGS. 9A to 9D illustrate aberrations upon focusing on infinity.

FIGS. 4A, 4B, 4C, and 4D illustrate aspheric aberration, astigmatism, distortion, and a lateral aberration, respectively, in a wide-angle end state of the zoom lens 1 corresponding to Numerical Example 1. FIGS. 5A to 5D illustrate these aberrations in an intermediate focal length state. FIGS. 6A to 6D illustrate these aberrations in a telephoto end state. In these aberration diagrams, aberrations at a reference wavelength of the d-line (587.6 nm) are illustrated. In the diagrams of astigmatism, S (a solid line) and T (a broken line) indicate aberrations in a sagittal direction and a tangential direction, respectively. As the lateral aberration, aberrations at a plurality of relative field heights are illustrated.

Likewise, FIGS. 7A to 7D to FIGS. 9A to 9D illustrate spherical aberration, astigmatism, distortion, and lateral aberration of the zoom lens 2 corresponding to Numerical Example 2.

It is apparent from respective aberration diagrams that, in respective examples, a small, lightweight, and high-performance zoom lens with high power exceeding a magnification of 7 is achievable.

Other Embodiments

The present disclosure is not limited to the above-described embodiment and the above-described examples, and may be variously modified. For example, shapes and numerical values of components illustrated in the above-described numerical examples are mere examples for carrying out the present disclosure, and the technical scope of the present disclosure is not to be construed in a limiting sense by the shapes and numerical values.

Moreover, in the above-described embodiment and the above-described examples, a configuration including four lens groups is described; however, a configuration further including a lens not substantially having refractive power may be used.

Moreover, for example, the disclosure may have the following configurations.

(1) A zoom lens including:

a first lens group having positive refractive power, a second lens group having negative refractive power, a third lens group having positive refractive power, and a fourth lens group having positive refractive power, the first to fourth lens groups being arranged in order from an object side, in which zooming is performed through varying a distance between adjacent lens groups of the first to fourth lens groups, and the fourth lens group includes a first positive lens, a first negative meniscus lens, and a cemented lens which are arranged in order from the object side, the cemented lens being configured of a second negative meniscus lens with a convex surface facing the object side and a second positive lens.

(2) The zoom lens according to (1), in which the third lens group includes a cemented lens being configured of a third meniscus lens and a positive lens, and a fourth negative meniscus lens which are arranged in order from the object side, the third meniscus lens having a convex surface facing the object side, and the fourth negative meniscus lens having a convex surface facing an image side.

(3) The zoom lens according to (1) or (2), in which the following conditional expression is satisfied:

$$2 \leq f3/f4 < 3 \qquad (1)$$

where f3 is a focal length of the third lens group, and f4 is a focal length of the fourth lens group.

(4) The zoom lens according to any one of (1) to (3), in which the following conditional expression is satisfied:

$$4 < ft/R31 < 5 \qquad (2)$$

where ft is a focal length of a whole system of the zoom lens at a telephoto end, and R31 is a radius of curvature of a lens surface located closest to the object side of the third lens group.

(5) The zoom lens according to any one of (1) to (4), in which the following conditional expression is satisfied:

$$0 < |(R31+R35)/(R31-R35)| < 1 \qquad (3)$$

where R31 is a radius of curvature of a lens surface located closest to the object side of the third lens group, and R35 is a radius of curvature of a lens surface located closest to an image side of the third lens group.

(6) The zoom lens according to any one of (1) to (5), in which the following conditional expression is satisfied:

$$2 < f4r/f4 < 3 \qquad (4)$$

where f4r is a focal length of the cemented lens in the fourth lens group, and f4 is a focal length of the fourth lens group.

What is claimed is:

1. A zoom lens comprising:
a first lens group having positive refractive power, a second lens group having negative refractive power, a third lens group having positive refractive power, and a fourth lens group having positive refractive power, the first to fourth lens groups being arranged in order from an object side,
wherein zooming is performed through varying a distance between adjacent lens groups of the first to fourth lens groups, and
the fourth lens group includes a first positive lens, a first negative meniscus lens, and a cemented lens which are arranged in order from the object side, the cemented lens being configured of a second negative meniscus lens with a convex surface facing the object side and a second positive lens.

2. The zoom lens according to claim 1, wherein the third lens group includes a cemented lens being configured of a third meniscus lens and a positive lens, and a fourth negative meniscus lens which are arranged in order from the object side, the third meniscus lens having a convex surface facing the object side, and the fourth negative meniscus lens having a convex surface facing an image side.

3. The zoom lens according to claim 1, wherein the following conditional expression is satisfied:

$$2 \leq f3/f4 < 3 \qquad (1)$$

where f3 is a focal length of the third lens group, and f4 is a focal length of the fourth lens group.

4. The zoom lens according to claim 1, wherein the following conditional expression is satisfied:

$$4 < ft/R31 < 5 \quad (2)$$

where ft is a focal length of a whole system of the zoom lens at a telephoto end, and R31 is a radius of curvature of a lens surface located closest to the object side of the third lens group.

5. The zoom lens according to claim 1, wherein the following conditional expression is satisfied:

$$0 < |(R31+R35)/(R31-R35)| < 1 \quad (3)$$

where R31 is a radius of curvature of a lens surface located closest to the object side of the third lens group, and R35 is a radius of curvature of a lens surface located closest to an image side of the third lens group.

6. The zoom lens according to claim 1, wherein the following conditional expression is satisfied:

$$2 < f4r/f4 < 3 \quad (4)$$

where f4r is a focal length of the cemented lens in the fourth lens group, and f4 is a focal length of the fourth lens group.

7. The zoom lens according to claim 1, wherein the following conditional expression is satisfied:

$$|1/(f43 \times v43) + 1/(f44 \times v44)| < 1 \times 10^{-4} \quad (5)$$

where f43 is a focal length of the second negative meniscus lens in the fourth lens group, v43 is an Abbe number of the second negative meniscus lens in the fourth lens group, f44 is a focal length of the second positive lens in the fourth lens group, and v44 is an Abbe number of the second positive lens in the fourth lens group.

8. The zoom lens according to claim 1, wherein the following conditional expression is satisfied:

$$2 < ft/dX1 < 3 \quad (6)$$

where ft is a focal length of a whole system of the zoom lens at a telephoto end, and dX1 is a moving distance in an optical axis direction of the first lens group when the zooming is performed from a wide-angle end to the telephoto end.

9. The zoom lens according to claim 1, wherein a lens surface on the object side of the first negative meniscus lens in the fourth lens group is aspheric.

10. The zoom lens according to claim 1, wherein the first to fourth lens groups are moved when the zooming is performed from a wide-angle end to a telephoto end, to allow a distance between the first lens group and the second lens group to be increased and to allow a distance between the second lens group and the third lens group and a distance between the third lens group and the fourth lens group to be decreased.

11. An image pickup unit with a zoom lens and an image pickup device outputting an image pickup signal based on an optical image formed by the zoom lens, the zoom lens comprising:

a first lens group having positive refractive power, a second lens group having negative refractive power, a third lens group having positive refractive power, and a fourth lens group having positive refractive power, the first to fourth lens groups being arranged in order from an object side, wherein zooming is performed through varying a distance between adjacent lens groups of the first to fourth lens groups, and the fourth lens group includes a first positive lens, a first negative meniscus lens, and a cemented lens which are arranged in order from the object side, the cemented lens being configured of a second negative meniscus lens with a convex surface facing the object side and a second positive lens.

* * * * *